(12) United States Patent
Bohman (10) Patent No.: US 7,797,847 B2
(45) Date of Patent: Sep. 21, 2010

(54) HANDS-FREE LEVEL

(75) Inventor: Roger A. Bohman, Franklin, WI (US)

(73) Assignee: Empire Level Mfg. Co., Mukwonago, WI (US)

( * ) Notice: Subject to any disclaimer, the term of this patent is extended or adjusted under 35 U.S.C. 154(b) by 82 days.

(21) Appl. No.: 12/208,171

(22) Filed: Sep. 10, 2008

(65) Prior Publication Data

US 2010/0058600 A1    Mar. 11, 2010

(51) Int. Cl.
*G01C 9/00* (2006.01)
(52) U.S. Cl. ........................................ 33/372
(58) Field of Classification Search .............. 33/370, 33/371, 372, 373, 379, 758; 248/229.13; 269/19; D10/69
See application file for complete search history.

(56) References Cited

U.S. PATENT DOCUMENTS

| | | | | |
|---|---|---|---|---|
| 841,272 | A * | 1/1907 | Read | 33/758 |
| 1,085,193 | A * | 1/1914 | Hipple | 33/758 |
| 1,111,677 | A | 9/1914 | Schade | |
| 1,263,229 | A | 4/1918 | Gordon | |
| 1,264,484 | A | 4/1918 | Bridgman | |
| 1,308,699 | A * | 7/1919 | Cusick | 33/343 |
| 1,435,054 | A | 11/1922 | Drummond | |
| 1,545,932 | A | 7/1925 | Williams | |
| 1,612,843 | A | 1/1927 | Timmis | |
| 1,620,469 | A | 3/1927 | Kirkhoff | |
| 1,786,845 | A * | 12/1930 | Hipple | 33/758 |
| 1,796,743 | A | 3/1931 | Biedenfeld | |
| 2,314,927 | A | 3/1943 | Farrington | |
| 2,531,563 | A | 11/1950 | Feldheim | |
| 2,624,118 | A | 1/1953 | Anderson | |
| 2,638,134 | A | 5/1953 | Kearney | |
| 2,752,692 | A * | 7/1956 | Smith | 33/374 |
| 2,915,273 | A | 12/1959 | Gavrun, Sr. | |
| 3,296,708 | A | 1/1967 | Moody | |
| 3,707,772 | A * | 1/1973 | Cotter | 33/373 |
| 3,851,401 | A | 12/1974 | Dearman | |
| 4,066,232 | A | 1/1978 | Hermeyer | |
| 4,663,856 | A * | 5/1987 | Hall et al. | 33/373 |
| 4,829,676 | A * | 5/1989 | Waldron | 33/372 |
| 4,843,728 | A | 7/1989 | Francis | |

(Continued)

*Primary Examiner*—R. A. Smith
(74) *Attorney, Agent, or Firm*—Jansson Shupe & Munger Ltd.

(57) ABSTRACT

A hands-free level for gauging structural-member orientation. The level includes an elongate frame with two side-faces and at least one main reference surface extending therealong and having a mainwidth, a level indicator secured to the frame, and a support arm to facilitate holding of the reference surface against the stud. The support arm has a proximal end and extends to a free distal end to which an end member is secured. The proximal end is pivotably secured to the frame about a pivot axis intersecting the side-faces such that the distal end and end member are movable between a storage position along one of the side-faces and a use position beyond the reference surface and stud. A coil spring is about the pivot axis biases the distal end and end member to the storage position. The end member extends from the distal end crosswise with respect to the mainwidth and terminates in a stud-engaging portion extending in a direction intersecting the plane of the reference surface. When the reference surface is against a stud surface, the stud-engaging portion engages the opposite side of the stud for hands-free holding of the level thereagainst.

24 Claims, 12 Drawing Sheets

U.S. PATENT DOCUMENTS

| | | | |
|---|---|---|---|
| 4,970,796 A | 11/1990 | Masters et al. | |
| 5,088,205 A | 2/1992 | Egbert | |
| 5,127,167 A | 7/1992 | Kennedy | |
| 5,148,605 A | 9/1992 | Julia | |
| 5,442,864 A | 8/1995 | Erman | |
| 5,581,900 A | 12/1996 | Payne | |
| 5,749,151 A * | 5/1998 | Scott et al. | 33/370 |
| 5,799,404 A | 9/1998 | Payne | |
| 5,815,937 A | 10/1998 | Glorioso, Jr. | |
| 5,819,425 A | 10/1998 | Payne | |
| 5,820,476 A | 10/1998 | Amato | |
| 6,026,581 A | 2/2000 | Gruetzmacher | |
| 6,131,298 A | 10/2000 | McKinney et al. | |
| 6,158,134 A | 12/2000 | Warner, Jr. et al. | |
| 6,332,277 B1 | 12/2001 | Owoc et al. | |
| 6,351,875 B1 | 3/2002 | Wright et al. | |
| 6,502,322 B2 * | 1/2003 | Smochek | 33/373 |
| 6,640,456 B2 | 11/2003 | Owoc et al. | |
| 6,796,045 B2 | 9/2004 | Hallee | |
| 7,117,606 B2 | 10/2006 | Brown | |
| 2001/0034945 A1 | 11/2001 | Smochek | |
| 2004/0000063 A1 | 1/2004 | Hallee | |
| 2005/0120572 A1 | 6/2005 | Valenti | |
| 2007/0245580 A1 * | 10/2007 | Jelinek | 33/372 |

* cited by examiner

HANDS-FREE LEVEL

FIELD OF THE INVENTION

This invention relates to levels and, more particularly, to levels and devices for holding levels against structural members for hands-free gauging of structural-member orientation.

BACKGROUND OF THE INVENTION

In the construction industry, levels are used to ensure that structural members are installed in their exact intended orientations. Some examples of such structural members are vertical and horizontal studs which have to be positioned as close to their respective plumb and level orientations as possible. In some cases, levels are also used to orient studs or other structural members at specific angles. In such situations two people are often involved in the process of stud installation, because one person holds the level against the structural member while the other person adjusts structural-member orientation and secures it in the proper orientation.

Very often a person who works alone needs to gauge a structural member such as a stud for its vertical orientation. This task becomes difficult because the holding on the level and the fastening of the stud typically have to be done simultaneously. Even if a sole worker were able to gauge the stud with one hand while fastening the stud with the other, such task would require an extra physical strain which increases the risk of injury and makes the operation much slower than desired and may still result in inaccurate orientation of the stud.

There have been various devices that have offered certain support for levels against structural members, but such devices have problems or disadvantages rendering them of little use in most situations.

One example of such devices is described in U.S. Pat. No. 3,296,708 to Moody. The Moody device, however, is designed for use with walls which have either a plurality of holes therethrough or an apertured mesh such that the Moody device can engage the holes or the mesh apertures to secure the level against the wall. The Moody device would not secure a level to a stud. Furthermore, the Moody device is not usable for securing a level in orientations other than vertical such as holding the level to the bottom of a generally horizontally oriented structural member.

Another example of such devices is described in U.S. Pat. No. 5,088,205 to Egbert. The Egbert device requires special manipulation with an adjustable gripping element. Such gripping element, depending on its orientation with respect to an arm, is either freely slidable along the arm or is held in place thereon. The Egbert device requires precise positioning of the gripping element to secure a level against a stud or other object. The level, however, can become easily disengaged from the stud if the gripping element is not in its correct position or if such position changes due to adjustment movements of the level or the stud. Such disengagement would result in unfortunate falling of the level which may become damaged or completely broken.

Yet another example of a device intended for holding a level against a structural member is described in U.S. Pat. No. 5,815,937 to Glorioso, Jr. The Glorioso device would not be operable in the intended manner described in the Glorioso patent. More specifically, despite its rather complicated construction the Glorioso device, as shown, would not hold the level against a structural component, at least because spring 146, by virtue of its manner of mounting, would fail to draw the arm against the object to be gauged.

In summary, there is a need for an improved level which is held securely against a stud or other structural member and which overcomes all of the aforementioned problems.

OBJECTS OF THE INVENTION

It is an object of the invention to provide an improved level which is held securely against a stud or other structural member and which overcomes some of the problems and shortcomings of the prior art, including those referred to above.

Another object of this invention is to provide a level allowing easy hands-free operation, such that a person working alone can install studs and similar structural elements quickly and without any need for a helper.

Another object of the invention is to provide a level which is easily secured against a stud.

Another object of the invention is to provide a level which is reliably held against the stud with minimal chances for accidental disengagement.

Yet another object of the invention is to provide a level which can be held against structural members of various sizes and configurations.

How these and other objects are accomplished will become apparent from the following descriptions and the drawings.

SUMMARY OF THE INVENTION

This invention, which will be described in detail below, is an improvement in levels for gauging stud orientation, or the orientation of a wide variety of structural members. While there is much reference in this document to studs, such as the common wooden studs used in building framing, the term "stud" is not to be taken as a limiting term when it comes to the usefulness of the invention. Use with wooden structural members, metal structural elements, or structural elements of other materials is contemplated.

The inventive level, which may be a box level, I-beam level or other level, is of the type including an elongate frame with two side-faces and at least one main reference surface which extends therealong and has a mainwidth. A level indicator is secured to the frame. The inventive level is of the type further including a support arm to facilitate holding of the reference surface against a stud.

In the inventive level, a support arm has a proximal end and extends to a free distal end to which an end member is secured. The proximal end is pivotably secured to the frame about a pivot axis intersecting the side-faces such that the distal end and end member are movable between a storage position along one of the side-faces and a use position beyond the reference surface and stud. A coil spring is preferably about the pivot axis to bias the distal end and end member to the storage position. The end member extends from the distal end crosswise with respect to the mainwidth and terminates in a stud-engaging portion extending in a direction intersecting the plane of the reference surface. When the reference surface is against a stud surface the stud-engaging portion engages the opposite side of the stud for hands-free holding of the level thereagainst.

In some preferred embodiments, the stud-engaging portion of the end member is a pointed end for piercing engagement with the stud. The pointed end allows for secure holding of the level which is stable enough that the level may be positioned below a stud and remain securely against the stud despite impacts such as caused by hammering.

The pointed end preferably extends at an acute angle with respect to the direction of the support arm such that, when engaged with a substantially vertical stud at a position above the pivot axis, gravity facilitates the hands-free holding. The end member also preferably includes a cross-portion extending from the distal end of the arm crosswise with respect to the mainwidth to the stud-engaging portion. It is preferred that the stud-engaging portion be substantially perpendicular to the cross-portion.

In some alternative embodiments, the stud-engaging portion may extend directly from the distal end diagonally in a direction which is both crosswise the mainwidth and intersecting the reference-surface plane.

In some embodiments, the end member is preferably a friction member for frictional engagement with the stud. Such embodiments are usable for gauging finished objects, such as furniture, doors or windows. Such frictional engagement is also useful for various structural elements which are not easily pierced as in case of metal structural members.

The side-face along which the support arm is in its storage position is preferably recessed such that the support arm and end member are recessed in the storage position.

In some preferred embodiments, the arm has an adjustable arm-length such that the stud-engaging portion is engageable along the middle third of the length of the level frame despite being used with studs of different sizes (1×2's, 2×4's, 2×6's, 2×8's, etc.). In other words, the arm is adjustable such that contact of the stud-engaging portion with the stud may be achieved at a contact position such that a perpendicular line from the reference surface to the contact position will extend from the reference surface at a position in the middle third of the frame length, and preferably as close as possible to the mid-point of the frame length. The use of the adjustable arm-length allows for setting the arm-length to accommodate the stud size (based on the distance from the reference surface to the surface of the stud engaged by the stud-engaging portion).

The arm-length is preferably adjustable to a plurality of specific positions each of which corresponds to a specific stud size. The arm preferably includes arm-length markings indicating the corresponding stud size.

In the preferred embodiments of the type with the arm having an adjustable arm-length, the support arm preferably includes at least two interconnected length-sections. Such support arm further preferably includes at least one locking projection on one of the length-sections and a plurality of apertures spaced along the other one of the length-sections to receive the locking projection therethrough for setting a selected specific arm-length. The locking projection is preferably outwardly biased such that it extends through the aperture for secure connection. One example of such biasing is a spring-loaded nub that allows for depressing the nub into the aperture to adjust the arm-length. The nub securely extends through the aperture to firmly maintain the desired arm-length.

In some embodiments, the support arm is a single piece. The end member may also be a single piece. Such support arm and end member preferably form a single piece.

In certain preferred embodiments, the coil spring which biases the support am toward its storage position has first and second spring-ends. The first spring-end is held in fixed position with respect to the frame. The proximal end of the support arm preferably includes a coil-spring-engaging portion which engages the second spring-end.

In some preferred embodiments, including those described in the paragraph above, the proximal end of the support arm is preferably further axially biased toward the side-face of the storage position and is axially depressible to the support-arm pivot use position.

DETAILED DESCRIPTION OF PREFERRED EMBODIMENTS

The drawings show an improved level 10 for gauging orientation of a stud 1. Improved level 10 is of a type that includes an elongate frame 11 with two side-faces 12 and at least one main reference surface 13 which extends along side-faces and has a mainwidth 14. A level indicator 15 is secured to frame 11. Inventive level 10 further includes a support arm 20 to facilitate holding of reference surface 13 against stud 1.

Figure 1:
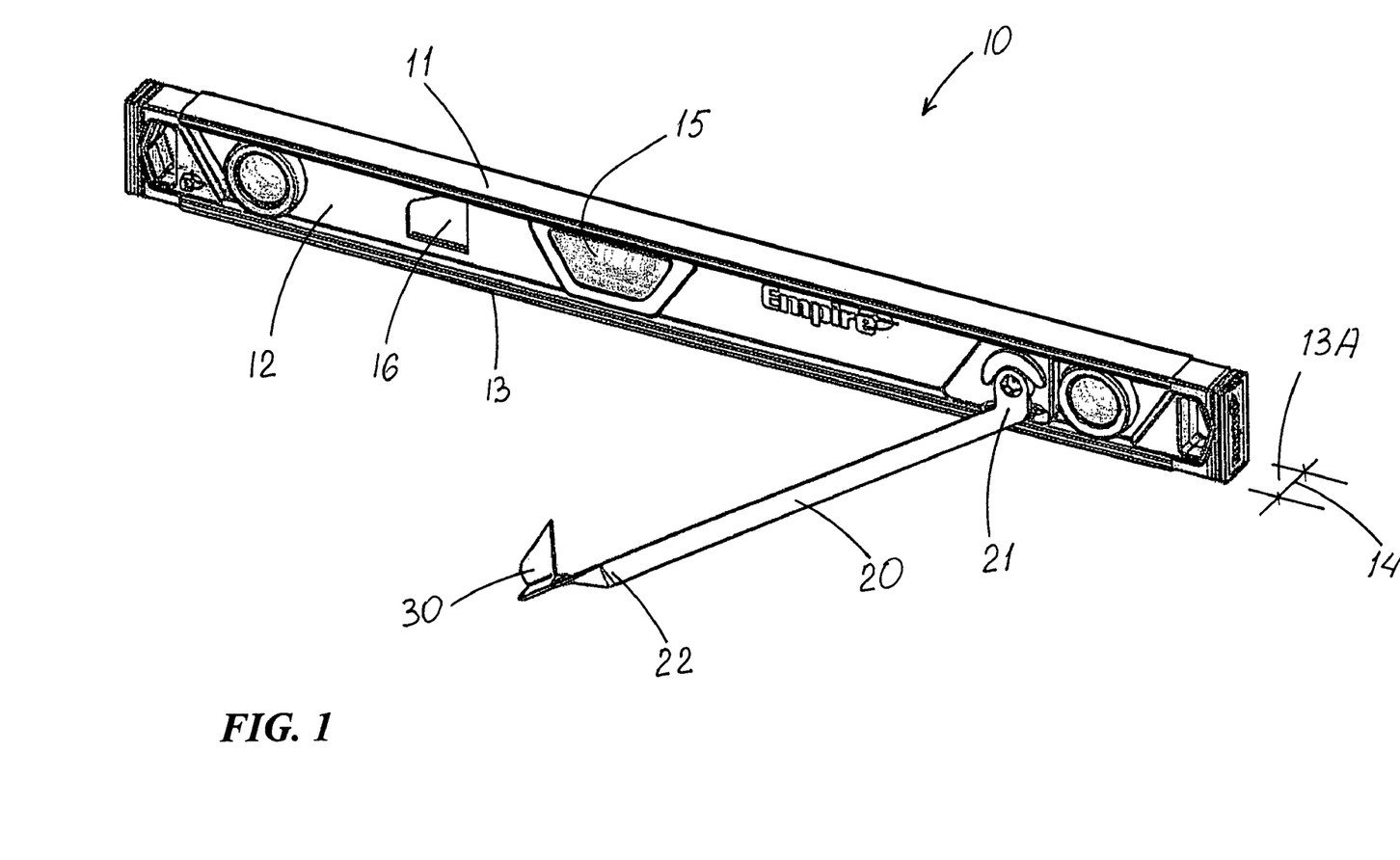
FIG. 1 is a perspective view of one embodiment of a level of this invention with a support arm in its pivoting use position.
Figure 2:
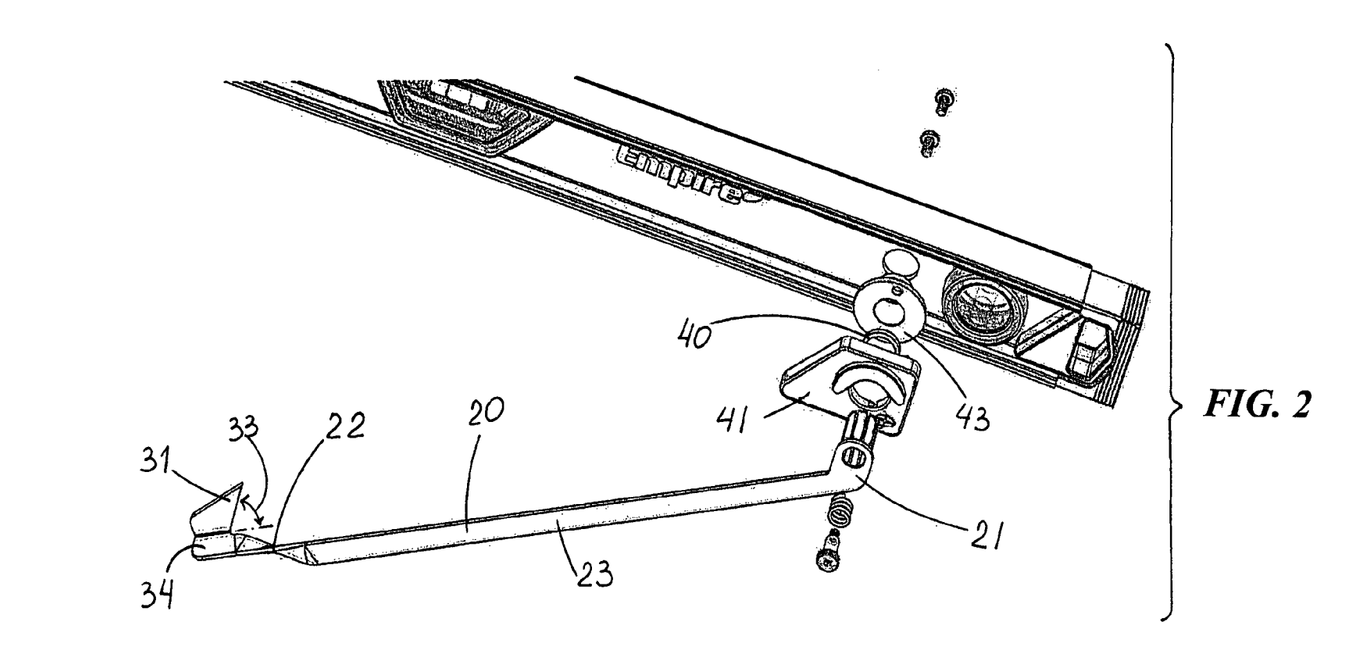
FIG. 2 is an exploded perspective view of the level of FIG. 1.
Figure 5:
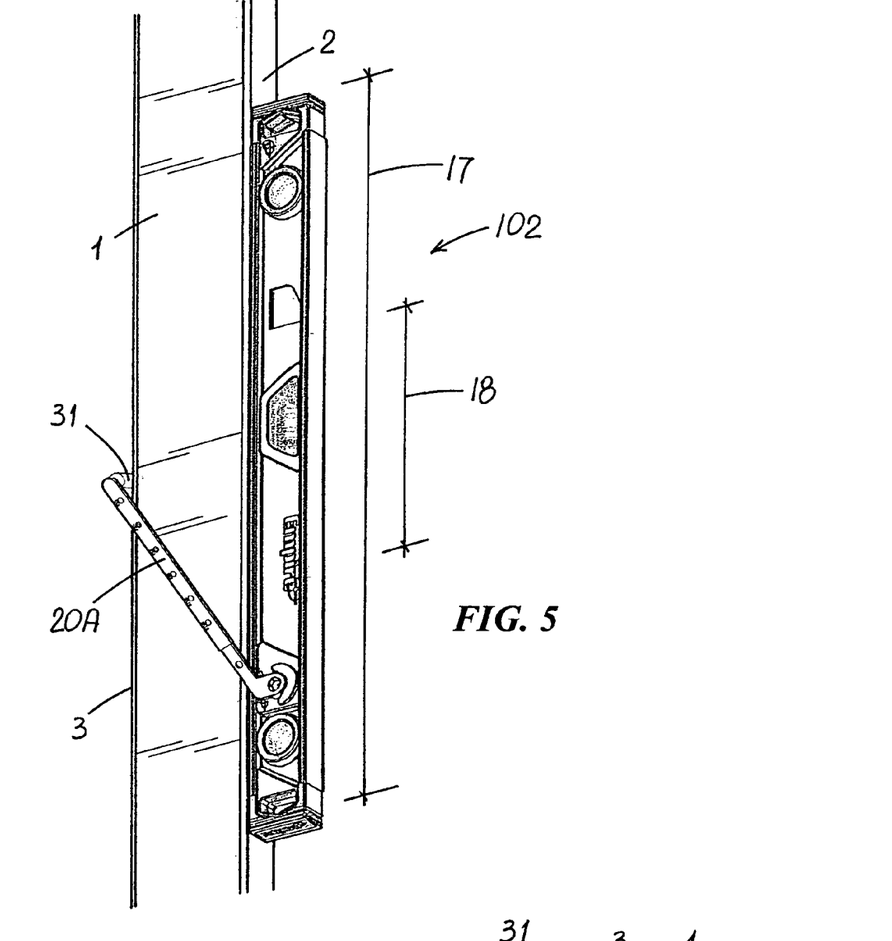
FIG. 5 is a perspective view of a level of the present invention which has an adjustable arm-length, the level being shown against a vertical stud.
Figure 6:
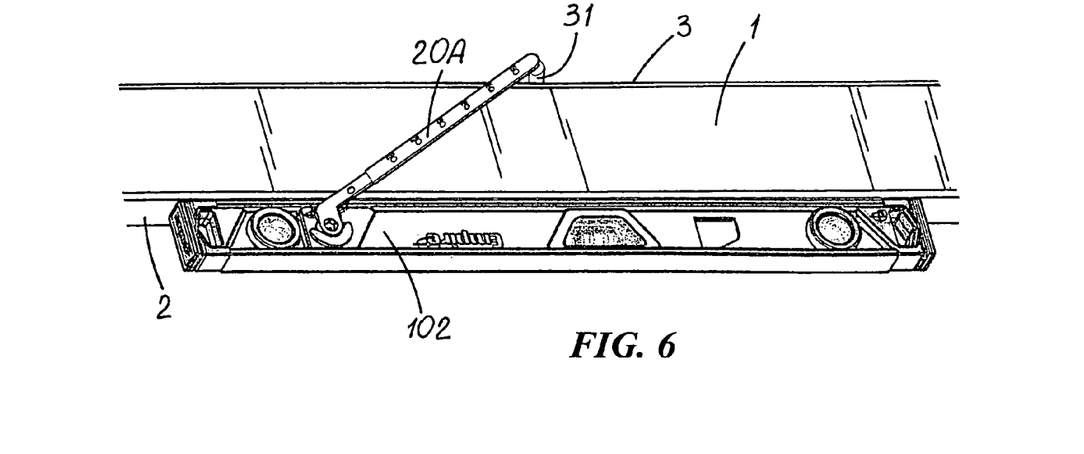
FIG. 6 is a perspective view of the level as in FIG. 5 shown against a horizontal stud.
Figures 7, 13:
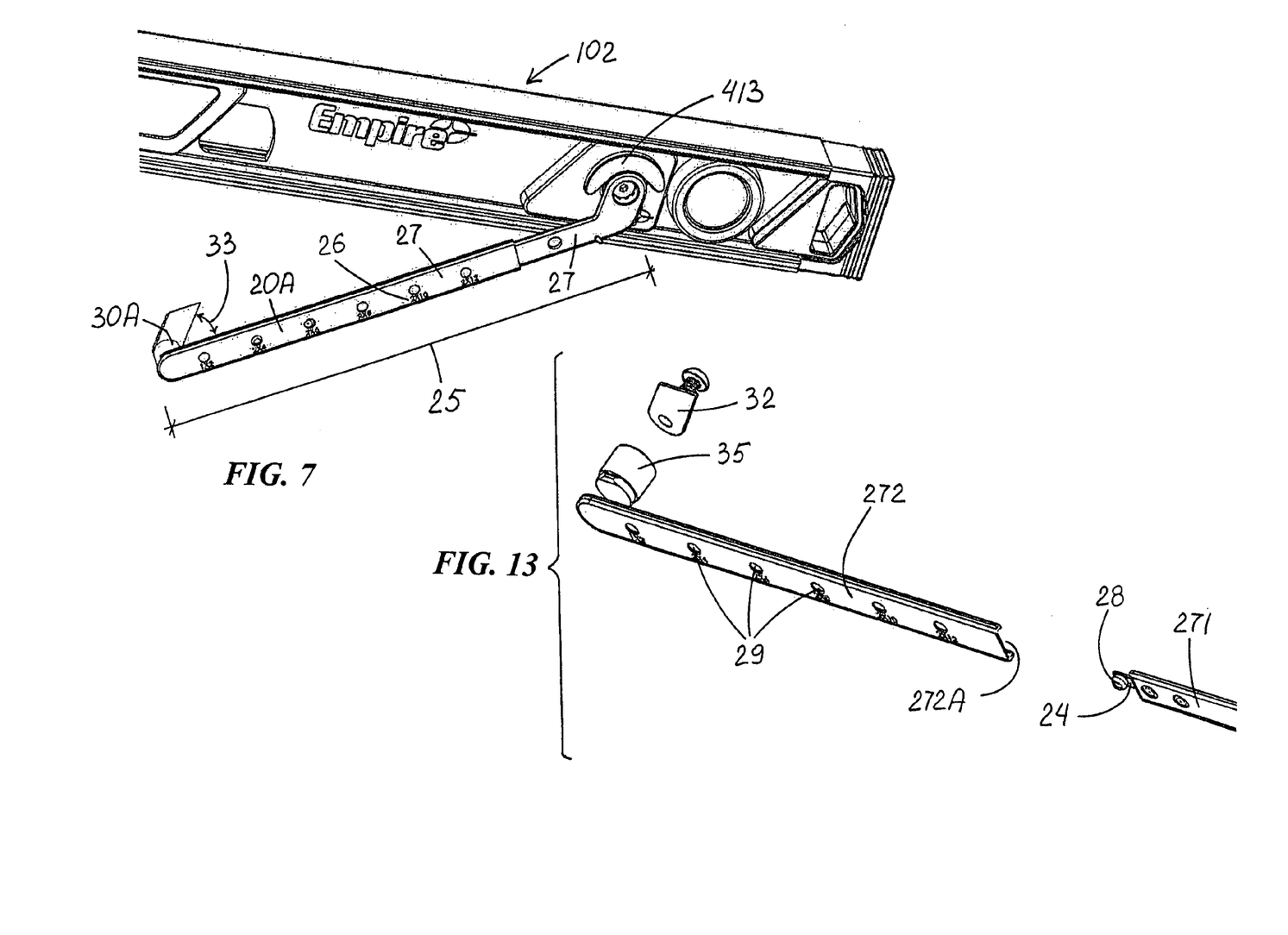
FIG. 7 is a perspective fragmentary view of the level of FIG. 5 better showing the support arm.
FIG. 13 is another exploded fragmentary perspective view illustrating the interconnection of the arm length-sections and the end member of the level of FIG. 5.

In level 10, as shown in FIGS. 1-7, support arm 20 has a proximal end 21 and extends to a free distal end 22 to which an end member 30 is secured. As best seen in FIG. 2, proximal end 21 is pivotably secured to frame 11 about a pivot axis 5 intersecting side-faces 12 such that distal end 22 and end member 30 are movable between a storage position (illustrated in FIGS. 3 and 14) along one of side-faces 12 and a use position beyond reference surface 13 and stud 1, as illustrated in FIGS. 1, 5 and 6. End member 30 extends from distal end 22 crosswise with respect to mainwidth 14 and terminates in a stud-engaging portion 31 extending in a direction intersecting the plane 13A of reference surface 13. FIGS. 6 and 7 illustrate that, when reference surface 13 is against a stud surface 2, stud-engaging portion 31 engages the opposite side 3 of stud 1 for hands-free holding of level 10 against stud 1.

Figures 3, 4, 4A:
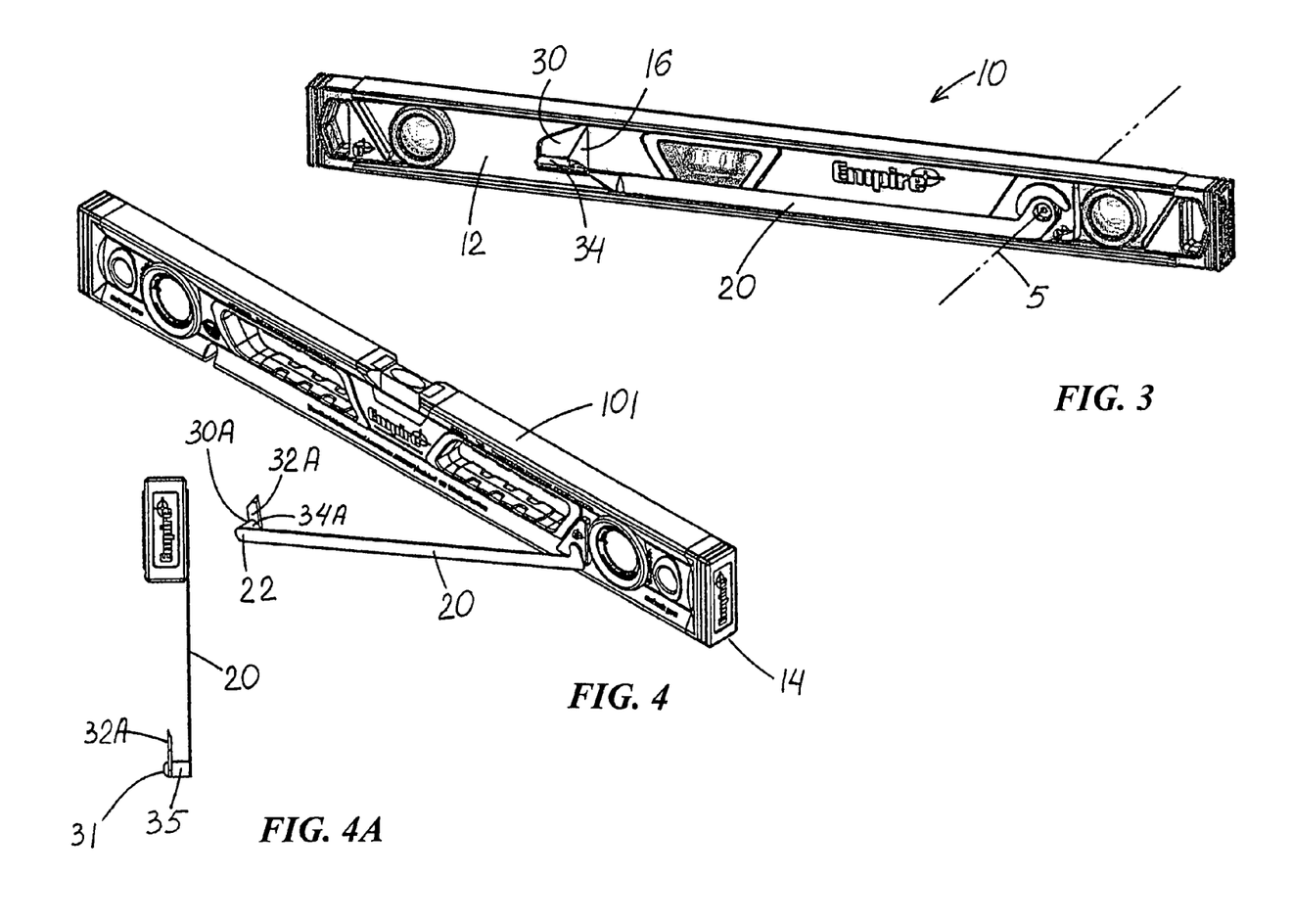
FIG. 3 is a perspective view of the level of FIG. 1 with the support arm in its storage position.
FIG. 4 is a perspective view of another embodiment of the level of this invention which is similar to the level of FIG. 1 except that it has a different end member.
FIG. 4A is a end-elevation view of the level of FIG. 4.
Figure 11:
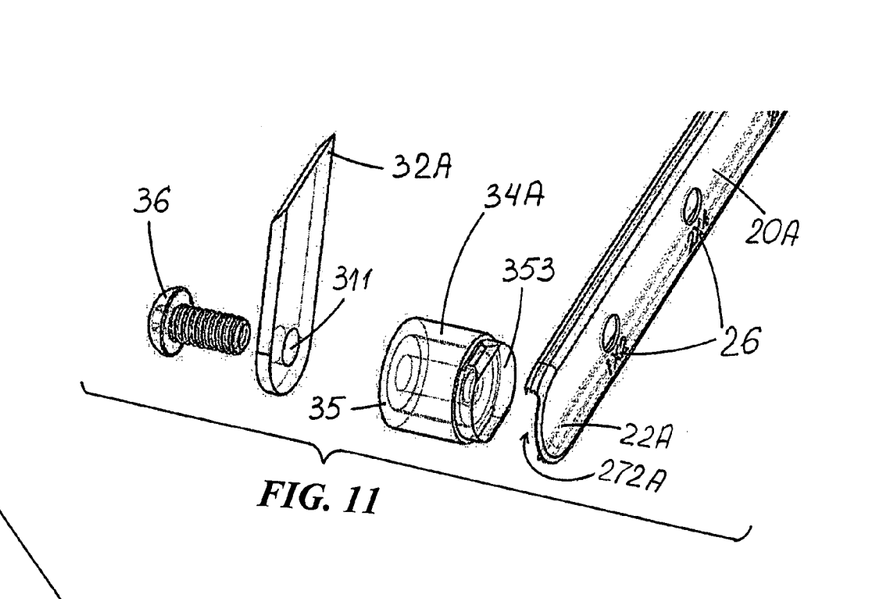
FIG. 11 is an enlarged fragmentary exploded perspective view of the stud-engaging end member of the level of FIG. 5.

As best seen in FIGS. 1 and 11, stud-engaging portion 31 of end member 30 may be a pointed end 32 for piercing engagement with the stud. Pointed end 32 allows for such secure holding of level 10 to stud 1 that level 10 may be positioned below stud 1 and that level 10 remains securely held against stud 1 even when stud 1 is affected by various impacts such as a hammer shock. FIG. 6 illustrates level 102 held against a bottom surface of horizontally-positioned stud 1. Pointed end 32 preferably extends at an acute angle 33 with respect to the direction of support arm 20 such that, when engaged with a substantially vertical stud 1 at a position above pivot axis 5, as shown in FIG. 5, gravity facilitates the hands-free holding. End member 30 also includes a cross-portion 34 which extends from distal end 22 of arm 20 crosswise with respect to mainwidth 14 to stud-engaging portion 31. FIGS. 2, 4 and 7 show stud-engaging portion 31 being substantially perpendicular to cross-portion 34.

Figure 8:
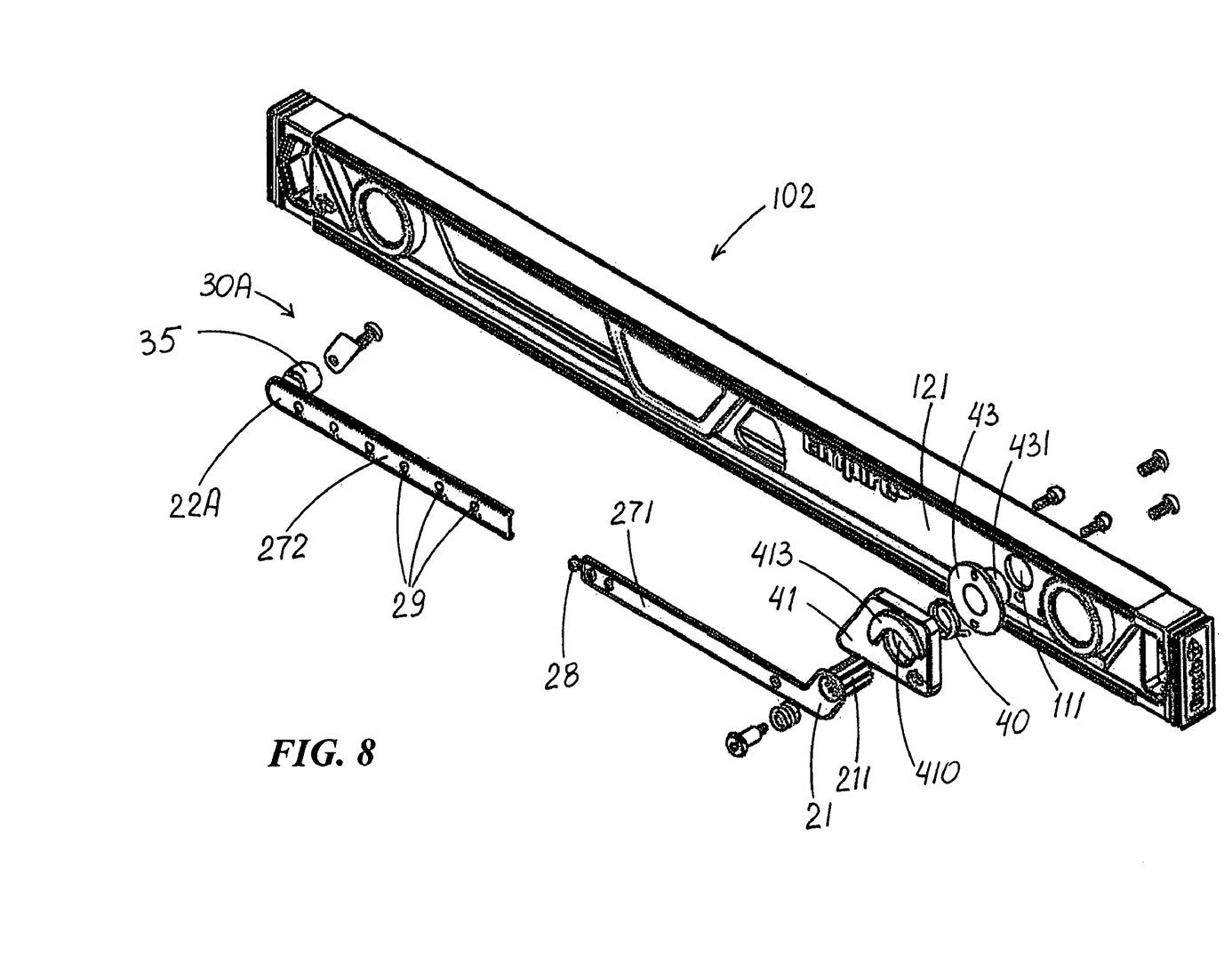
FIG. 8 is an exploded perspective view of the level of FIG. 5.
Figure 9:
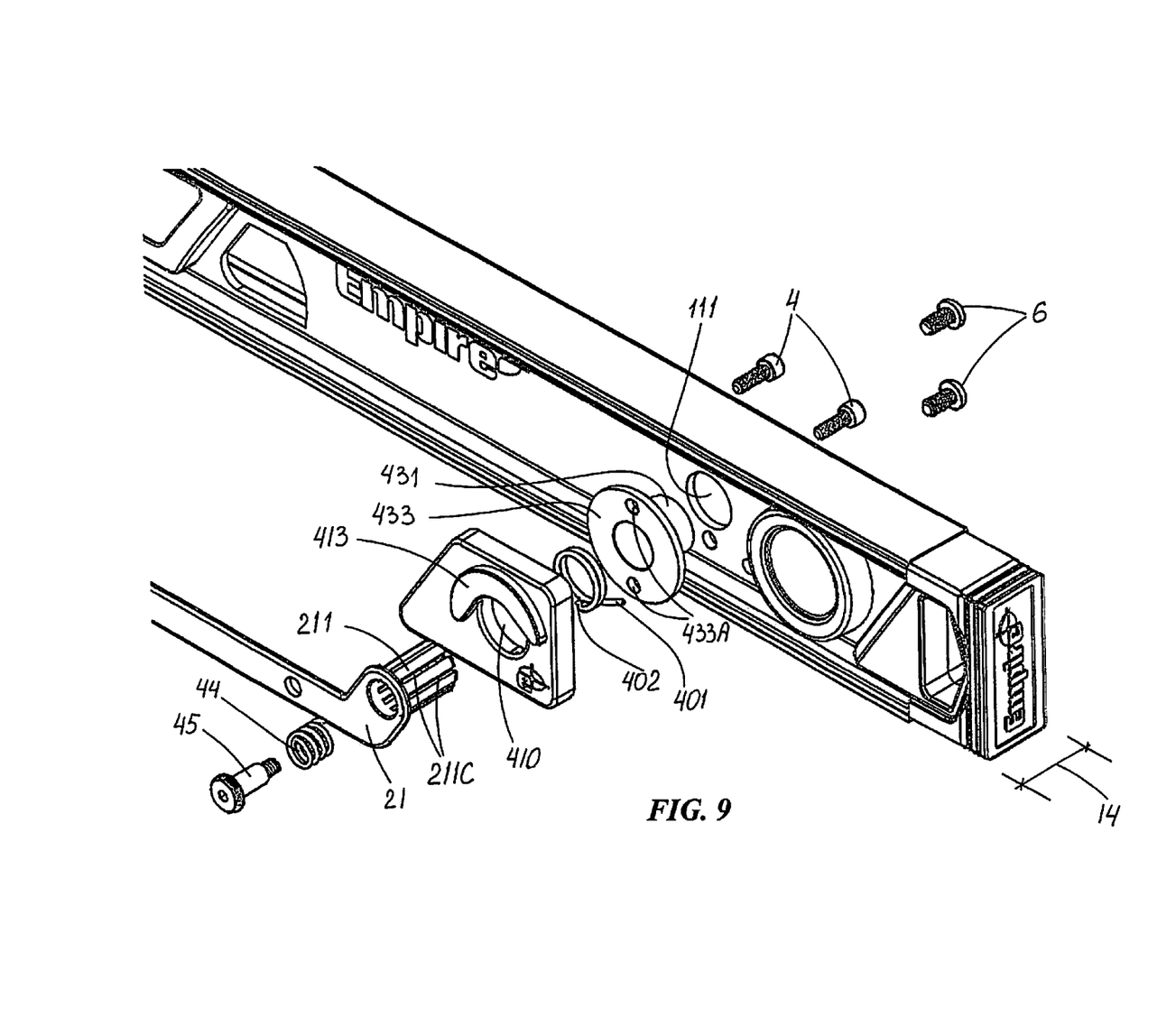
FIG. 9 is an enlarged fragmentary perspective view of FIG. 8.
Figure 10:
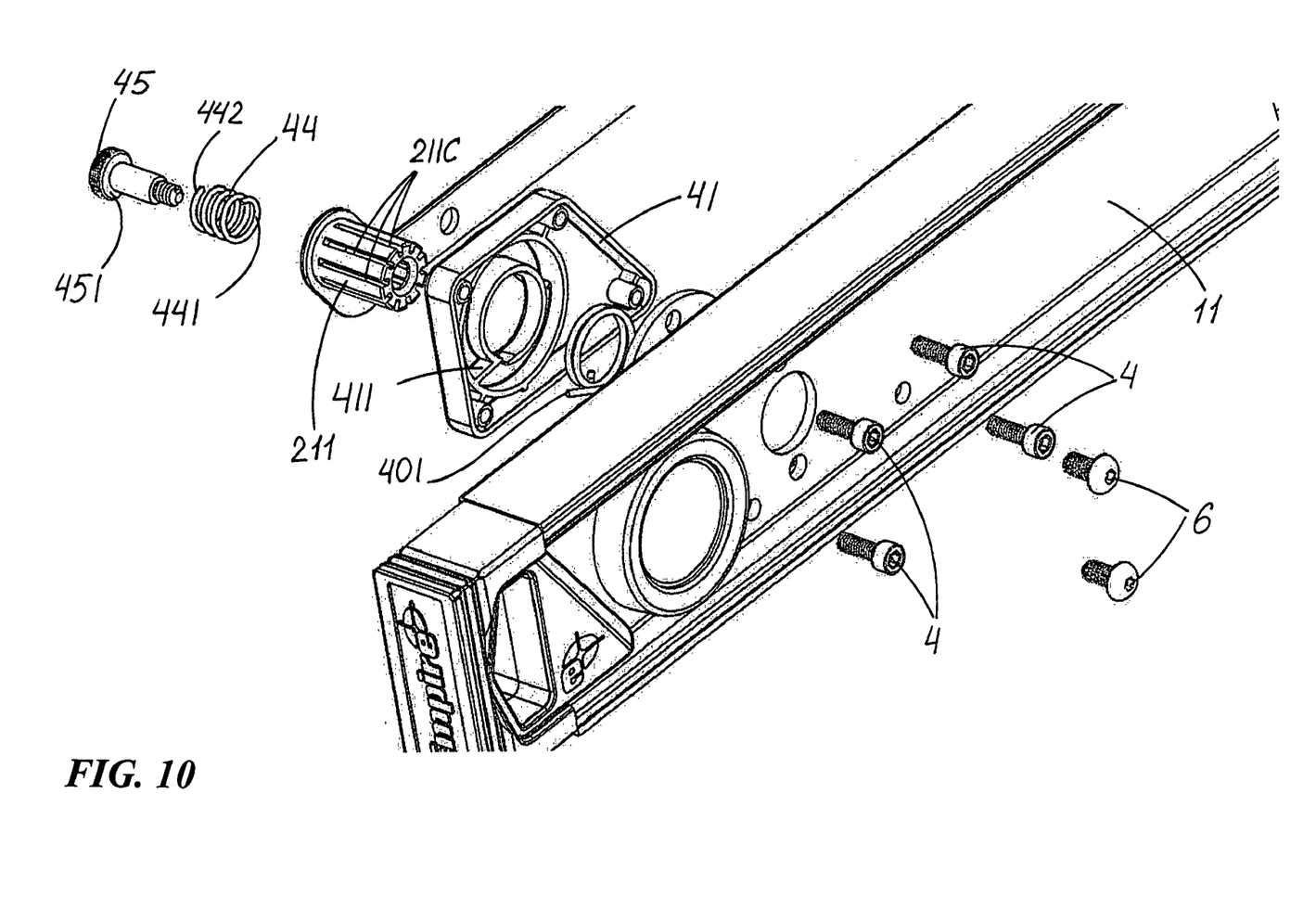
FIGS. 10 and 10A are yet other fragmentary exploded perspective views of the arm-mounting arrangement to the frame, shown from different angles.
Figure 10A:
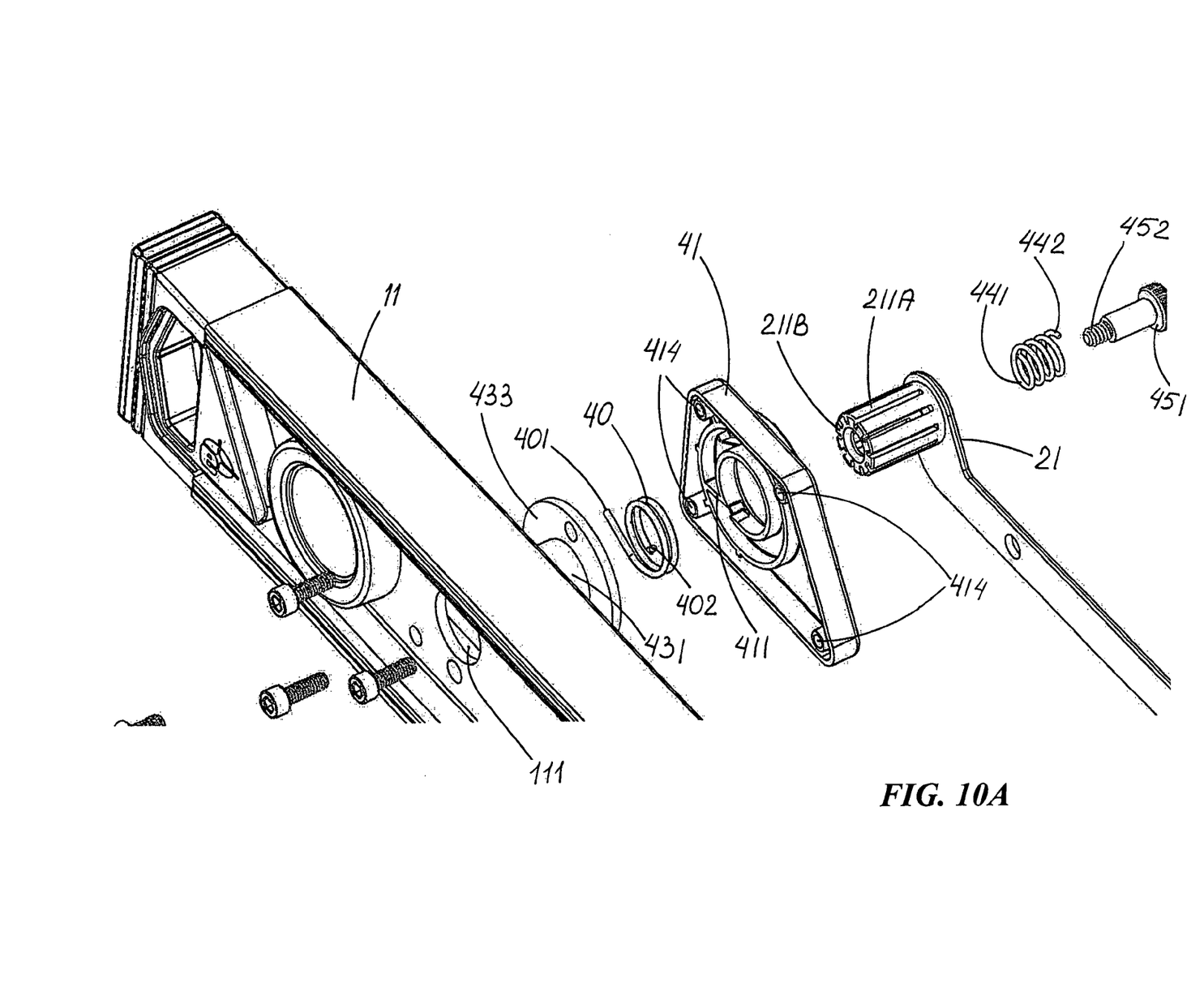
Figure 12:
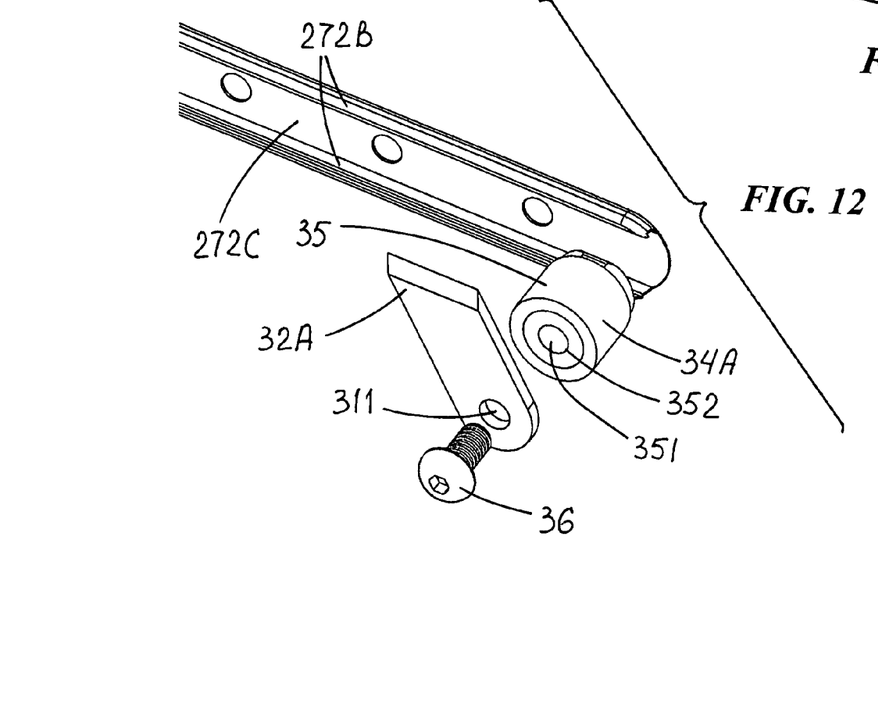
FIG. 12 is a fragmentary perspective view as in FIG. 11 but from a different angle to show aspects of the end member.

FIGS. 8, 11 and 12 show an embodiment with end member 30A which has a friction member 35 for frictional engagement with stud 1. FIGS. 11 and 12 best illustrate friction member 35 in form of cross-member 34A which is coated with a friction material such as rubber or any other suitable substance. When use of friction member 35 is desired to hold level 10 against an object, pointed end 32 can be rotated or removed to open friction member 35 for engagement with such object.

Figure 14:
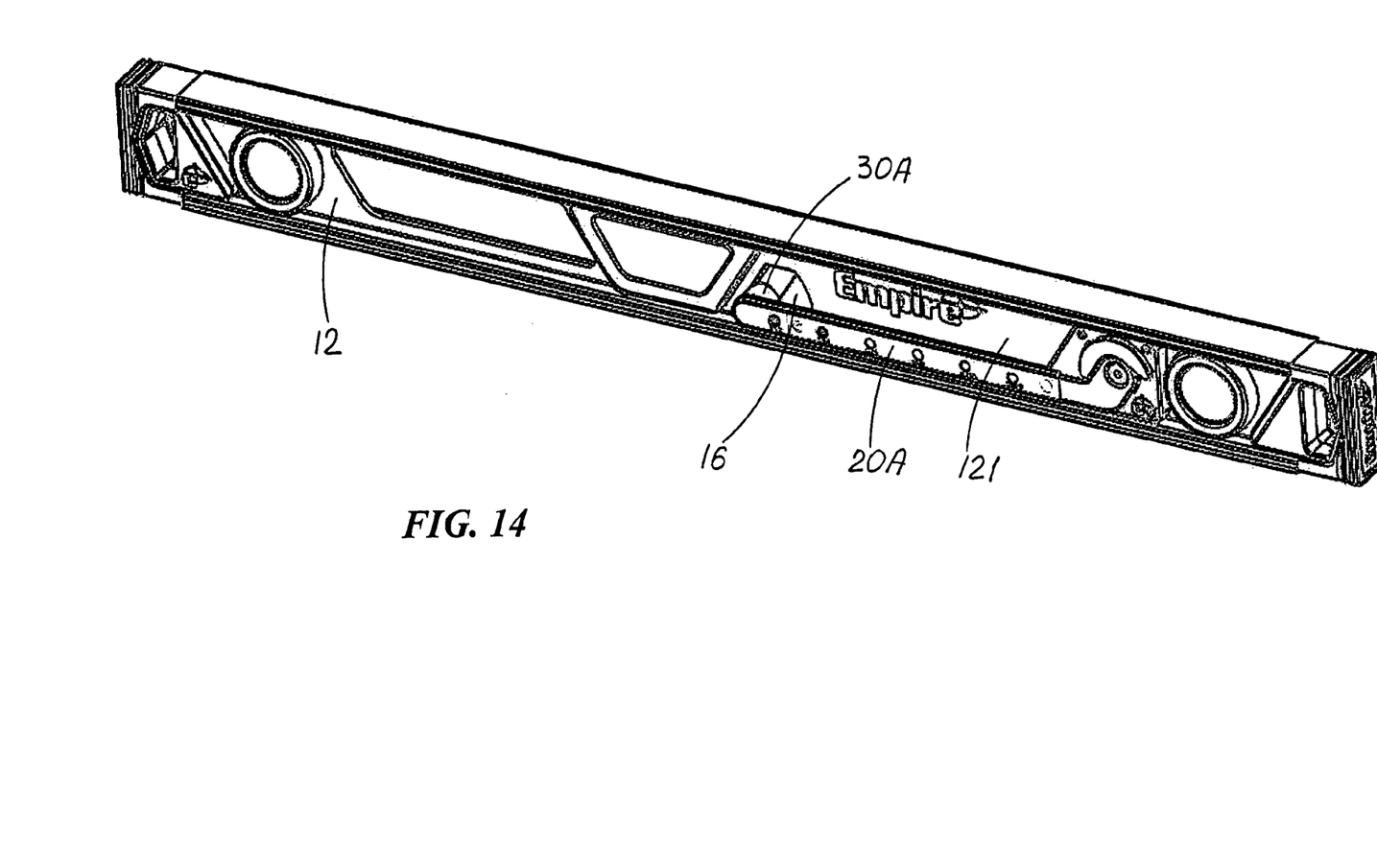
FIG. 14 is a perspective view of the level of FIG. 5 with the support arm in its storage position.
Figure 15:
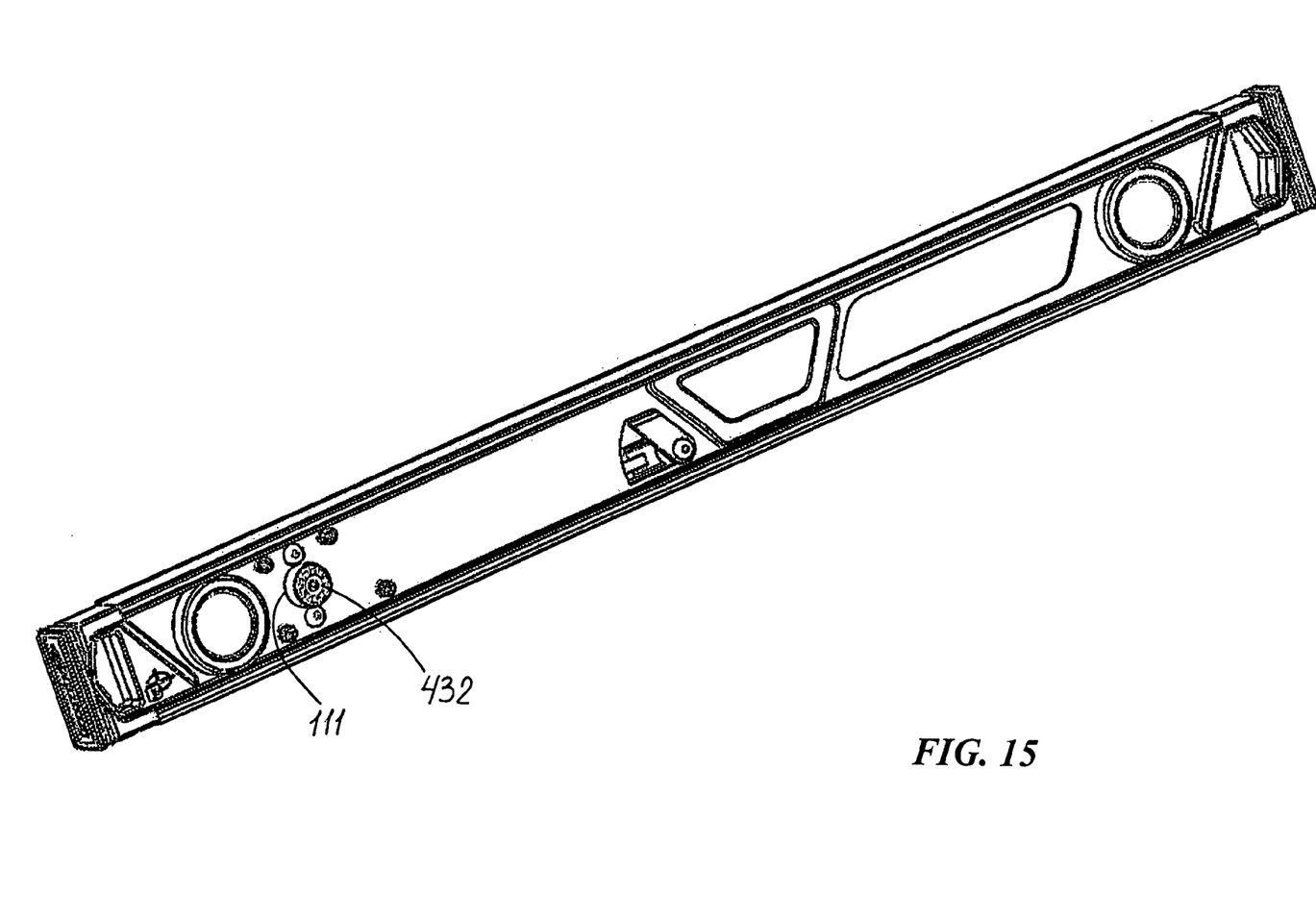
FIG. 15 is a perspective view of the other side-face of the level of FIG. 14.

FIGS. 3 and 14 show side-face 121, along which support arm 20 in its storage position, being recessed such that support arm 20 and end member 30 are recessed in their storage position. As further seen in FIGS. 3 and 14, frame 11 defines an aperture 16 which receives end member 30 for storage.

FIGS. 5-14 show support arm 20A which has an adjustable arm-length 25 such that stud-engaging portion 31 is engageable with studs of different sizes along the middle third 18 of the frame length 17. Adjustable arm-length 25 allows for setting an appropriate arm-length based on a stud size. The stud size defines a dimension between stud surface 2 and opposite side 3.

Arm-length 25 is adjustable to a plurality of specific positions each of which corresponds to a specific stud size. As best seen in FIGS. 7 and 11, arm 20A includes arm-length markings 26 indicating the corresponding stud size.

FIGS. 8 and 13 best illustrate that support arm 20A includes two interconnected length-sections 27. Support arm 20A further includes a locking projection 28 on one of length-sections 27 and apertures 29 spaced along the other one of length-sections 27 to receive locking projection 28 therethrough for setting a selected specific arm-length 25. Locking projection 28 is biased to extend through the aperture for secure connection. As best seen in FIG. 13, locking projection 28 is mounted on a detent member 24 secured to the corresponding length-section 27. Detent member 24 is made of a spring material which biases locking projection 28 for engagement into aperture 29. Such detent member 24 is depressible to free locking projection 28 from aperture 29 for movement along arm-length 25 to engage another aperture 29 for adjusting arm-length 25 to the selected length.

Figure 2A:
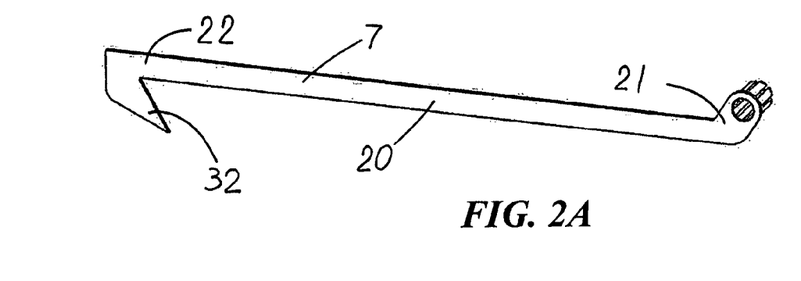
FIG. 2A is a perspective view of a blank of the single-piece support arm of FIG. 1 prior to shaping into the support-arm configuration.

FIGS. 1-3 show level 10 with support arm 20 being a single piece. In level 10, end member 30 is also a single piece. And, both support arm 20 and end member 30 together form a single piece; i.e., support arm 20 and end member 30 are together formed of one elongate piece of metal 7 (FIG. 2A). Support arm 20 shown in FIG. 2 has a substantially flat elongate structure defining arm-side surfaces 23 which are substantially parallel to side face 12 of frame 11. In support arm 20, distal end 22A is twisted about 90° to change orientation of piece of metal 7 by about 90° to continue as cross-portion 34 which extends substantially perpendicular to side-face 12 and crosswise mainwidth 14 to stud-engaging portion 31. Stud-engaging portion 31 extends substantially parallel to side-face 12 in the direction intersecting reference-surface plane 13A.

FIGS. 4 and 4A show level 101 with support arm 20 being a single piece. End member 30A is assembled of separate pointed end 32A and cross-portion 34A secured to distal end 22 of arm 20. Cross-portion 34A in level 101 is friction member 35. FIGS. 11-13 best show that cross-portion 34A friction member 35 has a bore hole 351 with a bore-hole opening 352 facing pointed end 32A. Pointed end 32A has an aperture 311 which corresponds to bore hole 351. A screw 36 extends through aperture 311 into bore hole 351 to secure pointed end 32A to friction member 35. When desired to use friction member 35 for engaging an object need to be gauged, pointed end 32A can be taken off by simply removing screw 36.

FIGS. 5-8 show yet another embodiment of level 102 which has support arm 20A made of two interconnected length-sections 27. One length-section 271 extends from proximal end 21 to terminate with locking projection 28. Locking projection 28 is on detent member 24 secured to length-section 271 for connection with length-section 272 which extends to distal end 22A. FIGS. 11-13 best illustrate that length-section 272 has a channel 272A formed by two curved sidewalls 272B extending from and along sides of a bottom wall 272C and shaped for secure slidable engagement of length-section 271. Length-sections 271 and 272 are fixed at the selected arm-length 25 by locking projection 28 extending through one of apertures 29 which are made through bottom wall 271C and are spaced therealong.

Level 102 has end member 30A with cross-portion 34A being friction member 35 secured to distal end 22A of length-section 272. Friction member 35 has an arm-mounting end-portion 353 which is configured to snugly slide into channel 272A for securement of cross-portion 34A to distal end 22A of arm 20A.

FIGS. 2, 8-10 and 15 illustrate a mounting arrangement of proximal end 21 to frame 11. A coil spring 40 is about pivot axis 5 to bias distal end 22 and end member 30 to the storage position. Coil spring 40 has first and second straight spring-ends 401 and 402. Level further includes a cover 41 which has a spring-retaining member 411 for holding first straight spring-end 401 in fixed position with respect to frame 11 (see FIG. 10). Support arm 20 has a coil-spring-engaging portion 211 which extends from proximal end 21 crosswise with respect to mainwidth 14. Spring-engaging portion 211 includes a substantially cylindrical axial portion 211A which terminates with a transverse annular portion 211B. Cylindrical portion 211A has a plurality of slots 211C therealong for biasing engagement of second straight spring-end 402. Cover 41 defines an axial aperture 410 sized to receive spring-engaging portion 211 therethrough for the engagement with coil spring 40. Cover 41 further includes a limiting collar 413 positioned around axial aperture 410 to limit range of pivot of support arm 20. Cover 41 is secured to frame 11 by screws 4 extending through side-faces 12 into screw-receiving portions 414 in cover 41.

Level 10 also includes a base member 43 which includes a sleeve portion 431 extending between a closed base-end 432 (FIG. 15) and an outward flange 433. Frame 11 has a sleeve-receiving aperture 111 through side-faces 12. Outward flange 433 is mounted against side-face 121 of the support-arm storage position and has mounting holes 433A which receive screws 6 extending through side-faces 12 to secure base member 43 to frame 11.

Proximal end 21 of support arm 20 is axially biased toward side-face 121 of the support-arm storage position and is axially depressible to a support-arm pivot use position. Level 10 further includes an axial coil spring 44 about a shoulder screw 45 which is positioned inside cylindrical axial portion 211A of spring-engaging portion 211. A first coil-end 441 of the spring 44 is against transverse annular portion 211B and a second coil-end 442 is against a screw head 451. Cylindrical axial portion 211A is in turn positioned through axial aperture 410 in cover 41 inside sleeve portion 431 of base member 43 such that a threaded end 452 of shoulder screw 45 is screwed into closed base-end 432. Therefore, to move support arm 20 into its use position, proximal end 21 is pulled away from frame 11 such that axial spring 44 is depressed to bias proximal end 21 of support arm 20 toward side-face 121 of the storage position.

While the principles of the invention have been shown and described in connection with specific embodiments, it is to be understood that such embodiments are by way of example and are not limiting.

The invention claimed is:

1. In a level for gauging stud orientation, the level including an elongate frame with two side-faces and at least one main reference surface extending therealong and having a mainwidth, a level indicator secured to the frame, and a support arm to facilitate holding of the reference surface against the stud, the improvement wherein:
   the support arm has a proximal end and extends to a free distal end to which an end member is secured, the proximal end being pivotably secured to the frame about a pivot axis intersecting the side-faces such that the distal end and end member are movable between a storage position along one of the side-faces and a use position beyond the reference surface and stud;
   a coil spring about the pivot axis biases the distal end and end member to the storage position, the coil spring has first and second spring-ends, the first spring-end being held in fixed position with respect to the frame;
   the proximal end of the support arm includes a coil-spring-engaging portion which engages the second spring-end, the proximal end of the support arm being axially biased toward the side-face of the support-arm storage position and is axially depressible to a support-arm pivot use position; and
   the end member extends from the distal end crosswise with respect to the mainwidth and terminates in a stud-engaging portion extending in a direction intersecting the plane of the reference surface,
whereby when the reference surface is against a stud surface the stud-engaging portion engages the opposite side of the stud for hands-free holding of the level thereagainst.

2. The level of claim 1 wherein the stud-engaging portion of the end member is a pointed end for piercing engagement with the stud.

3. The level of claim 2 wherein the pointed end extends at an acute angle with respect to the direction of the support arm such that, when engaged with a substantially vertical stud at a position above the pivot axis, gravity facilitates the hands-free holding.

4. The level of claim 3 wherein the end member also includes a cross-portion extending from the distal end of the arm crosswise with respect to the mainwidth to the stud-engaging portion.

5. The level of claim 4 wherein the stud-engaging portion is substantially perpendicular to the cross-portion.

6. The level of claim 1 wherein the end member is a friction member for frictional engagement with the stud.

7. The level of claim 1 wherein the side-face along which the support arm is in its storage position is recessed such that the support arm and end member are recessed in the storage position.

8. The level of claim 1 wherein the arm has an adjustable arm-length such that the stud-engaging portion is engageable with studs of different sizes along the middle third of the frame length.

9. The level of claim 1 wherein the support arm is a single piece.

10. The level of claim 1 wherein:
    the end member is a single piece; and
    the support arm and the end member form a single piece.

11. In a level for gauging stud orientation, the level including an elongate frame with two side-faces and at least one main reference surface extending therealong and having a mainwidth, a level indicator secured to the frame, and a support arm to facilitate holding of the reference surface against the stud, the improvement wherein:
    the support arm has a proximal end and extends to a free distal end to which an end member is secured, the proximal end being pivotably secured to the frame about a pivot axis intersecting the side-faces such that the distal end and end member are movable between a storage position along one of the side-faces and a use position beyond the reference surface and stud, the arm having an adjustable arm-length such that the stud-engaging portion is engageable with studs of different sizes along the middle third of the frame length, the arm-length being is adjustable to a plurality of specific positions each of which corresponds to a specific stud size;
    a coil spring about the pivot axis biases the distal end and end member to the storage position; and
    the end member extends from the distal end crosswise with respect to the mainwidth and terminates in a stud-engaging portion extending in a direction intersecting the plane of the reference surface,
whereby when the reference surface is against a stud surface the stud-engaging portion engages the opposite side of the stud for hands-free holding of the level thereagainst.

12. The level of claim 11 wherein the arm includes arm-length markings indicating the corresponding stud size.

13. The level of claim 11 wherein the support arm includes at least two interconnected length-sections.

14. The level of claim 13 wherein the support arm includes:
    at least one locking projection on one of the length-sections; and
    a plurality of apertures spaced along the other one of the length-sections to receive the locking projection therethrough to set a selected specific arm-length.

15. The level of claim 14 wherein the locking projection is outwardly biased such that it extends through the aperture for secure connection.

16. The level of claim 11 wherein:
    the coil spring has first and second spring-ends, the first spring-end being held in fixed position with respect to the frame; and
    the proximal end of the support arm includes a coil-spring-engaging portion which engages the second spring-end.

17. The level of claim 16 wherein the proximal end of the support arm is axially biased toward the side-face of the support-arm storage position and is axially depressible to a support-arm pivot use position.

18. In a level for gauging stud orientation, the level including an elongate frame with two side-faces and at least one main reference surface extending therealong having a mainwidth, a level indicator secured to the frame, and a support arm to facilitate holding of the reference surface against the stud, the improvement wherein:

the support arm has a proximal end and extends to a free distal end to which an end member is secured, the proximal end being pivotably secured to the frame about a pivot axis intersecting the side-faces such that the distal end and end member are movable between a storage position along one of the side-faces and a use position beyond the reference surface and stud;

a coil spring about the pivot axis to bias the distal end and end member to the storage position, the coil spring having first and second spring-ends, the first spring-end being held in fixed position with respect to the frame;

the proximal end of the support arm including a coil-spring-engaging portion which engages the second spring-end, the proximal end of the support arm being axially biased toward the side-face of the support-arm storage position and is axially depressible to a support-arm pivot use position; and the end member extends from the distal end crosswise with respect to the mainwidth and terminates in a stud-engaging piercing member extending in a direction intersecting the plane of the reference surface for piercing engagement with the stud, whereby when the reference surface is against a stud surface the piercing member pierces the opposite side of the stud for hands-free holding of the level thereagainst.

19. The level of claim 18 wherein the piercing member extends at an acute angle with respect to the direction of the support arm such that, when piercing a vertical stud at a position above the pivot axis, gravity facilitates the hand-free holding.

20. The level of claim 19 wherein the end member also includes a cross-portion extending from the distal end of the arm crosswise with respect to the mainwidth to the stud-engaging piercing member.

21. The level of claim 19 wherein the stud-engaging piercing member is substantially perpendicular to the cross-portion.

22. The level of claim 18 wherein the arm has an adjustable arm-length such that the stud-engaging portion is engageable with studs of different sizes along the middle third of the frame length.

23. The level of claim 18 wherein the support arm is a single piece.

24. The level of claim 18 wherein:

the end member is a single piece; and the support arm and the end member form a single piece.

\* \* \* \* \*

UNITED STATES PATENT AND TRADEMARK OFFICE
CERTIFICATE OF CORRECTION

| | | |
|---|---|---|
| PATENT NO. | : 7,797,847 B2 | |
| APPLICATION NO. | : 12/208171 | |
| DATED | : September 21, 2010 | |
| INVENTOR(S) | : Bohman | |

It is certified that error appears in the above-identified patent and that said Letters Patent is hereby corrected as shown below:

In column 3, line 58, delete "am" and insert --arm--.

Signed and Sealed this
Fifth Day of April, 2011

David J. Kappos
*Director of the United States Patent and Trademark Office*